United States Patent [19]
Ferro et al.

[11] 4,012,683
[45] Mar. 15, 1977

[54] METHOD AND APPARATUS FOR REDUCING INVERTER NO-LOAD LOSSES

[75] Inventors: Armand P. Ferro; John P. Walden, both of Schenectady, N.Y.

[73] Assignee: General Electric Company, Schenectady, N.Y.

[22] Filed: Aug. 18, 1975

[21] Appl. No.: 605,419

[52] U.S. Cl. ............................. 321/45 R; 307/100; 321/45 S

[51] Int. Cl.² ..................................... H02M 7/515

[58] Field of Search ............ 321/4, 11, 12, 14, 16, 321/19, 37, 45 S, 45 R, 44; 317/9 A, 13 A; 328/8, 259, 261, 262; 325/492, 494; 331/62, 113 A; 307/85, 100, 115

[56] References Cited

UNITED STATES PATENTS

| | | | |
|---|---|---|---|
| 2,534,036 | 12/1950 | Lamm | 321/11 |
| 3,496,446 | 2/1970 | Griffey | 325/496 |
| 3,723,812 | 3/1973 | Lynch | 317/31 |
| 3,816,809 | 6/1974 | Kuster | 321/14 |
| 3,885,572 | 5/1975 | Chen | 321/21 |
| 3,889,153 | 6/1975 | Pierce | 321/14 |
| 3,943,408 | 3/1976 | Jakobs et al. | 317/16 |

FOREIGN PATENTS OR APPLICATIONS

| | | | |
|---|---|---|---|
| 1,383,673 | 2/1975 | United Kingdom | 321/14 |

OTHER PUBLICATIONS

Electronics, "Inverter Control Circuit Saves Power", p. 56, Aug. 4, 1961.

*Primary Examiner*—William H. Beha, Jr.
*Attorney, Agent, or Firm*—Jerome C. Squillaro; Joseph T. Cohen

[57] ABSTRACT

No-load losses normally associated with transformer-isolated inverter circuits employing high frequency switching devices are substantially eliminated by electrically short-circuiting the load terminals of the inverter to quickly and efficiently shut down inverter operation and thereby reduce the no-load losses to at least the fall-back current losses of the inverter.

10 Claims, 3 Drawing Figures

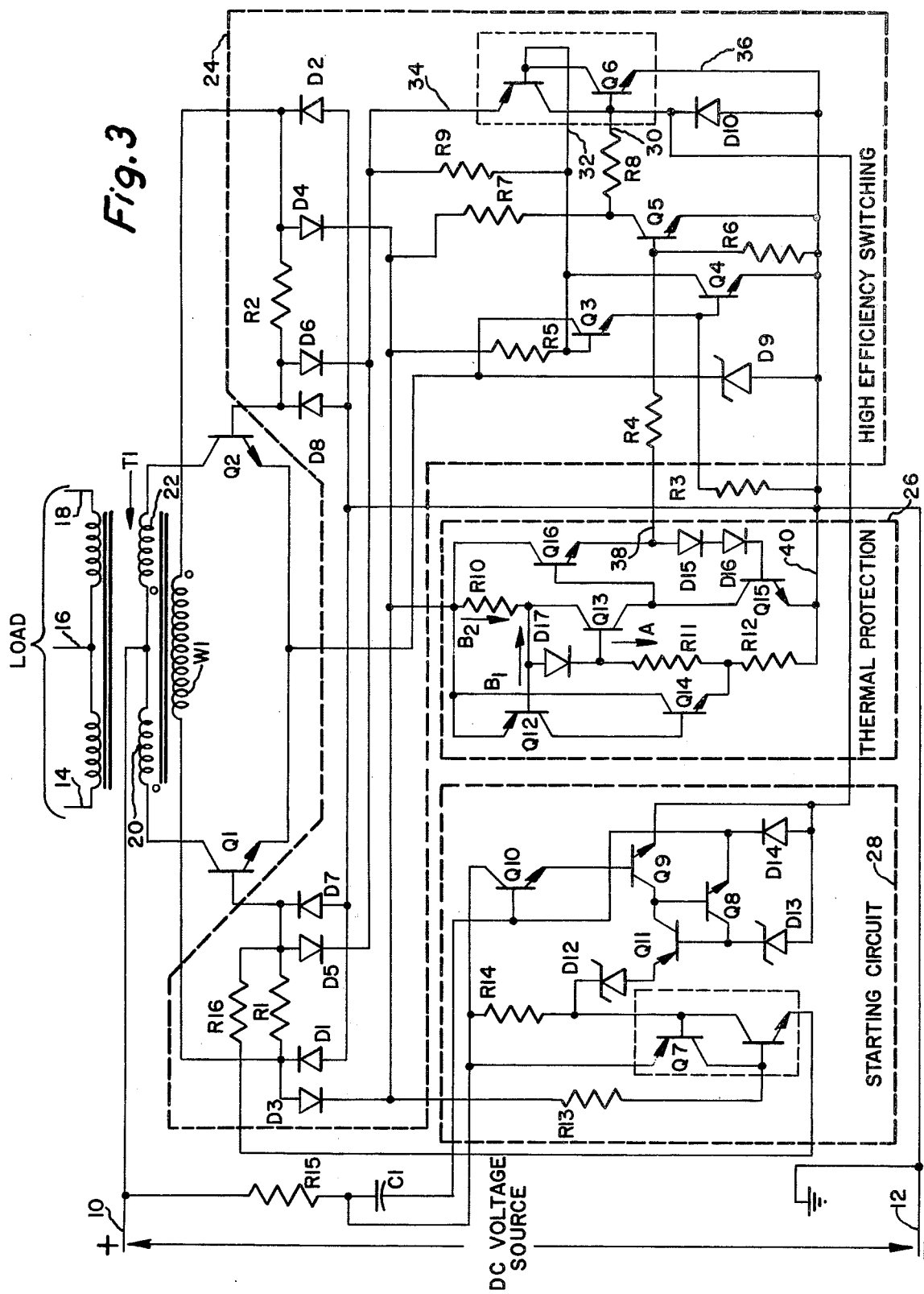

METHOD AND APPARATUS FOR REDUCING INVERTER NO-LOAD LOSSES

This invention relates generally to electrical inverter circuits for converting a dc electrical input to an ac electrical output. More particularly, this invention relates to an inverter having substantially reduced power losses during no-load conditions.

In general, the basic inverter circuit utilized with this invention is a transformer-isolated power supply which produces an ac electrical output in the secondary winding of a transformer in response to the alternate switching of a dc electrical input current in a magnetically coupled primary transformer winding. The alternate switching operation is carried out with active element switches, such as transistors, having appropriate power and switching characteristics. In addition, a tertiary winding is also magnetically coupled to the primary transformer winding and is utilized primarily to control the alternate switching operations of the active element switches. This general type of inverter circuit is, for instance, described in U.S. Pat. No. 3,781,638 and in copending application Ser. No. 516,773 filed Oct. 21, 1974 of common assignee as the instant application and now issued as U.S. Pat. No. 3,956,384.

Basic inverter circuits of the type described above may be utilized for a variety of applications, such as, providing power at a low voltage to a load such as an electical appliance. Generally, however, when the appliance is switched off, i.e., the load is removed from the inverter, the inverter continues to oscillate thereby continuing to consume power in the form of switching losses, transformer core losses and possibly rectifier losses, if employed. In many applications, these "no-load" losses are a substantial percentage of the full load losses. Since this mode of operation unnecessarily wastes energy in the no-load condition, it is desirable to reduce these losses substantially. However, it is desirable to reduce these losses without violating the integrity of the transformer isolation.

Briefly, our invention, as described more fully below, effectively stops inverter operation without violating the integrity of the transformer isolation by utilizing the short-circuit mode of operation to reduce the no-load losses substantially below the full load losses. More particularly, in accordance with our invention, upon removal of the normal load from the inverter, a short-circuit is applied to the load terminals to quickly and efficiently shut down the inverter and thereby reduce the no-load losses to the fall-back current losses which are substantially less than the no-load losses.

In accord with another aspect of our invention, the inverter is provided with a starting circuit which, in the absence of normal inverter operation, generates a starting pulse which conditions the active element swtiches and the electrical control elements to initiate a current flow in the primary winding of the transformer. If a normal load condition prevails, this action initiates a first cycle of inverter operation and the inverter will begin to oscillate in a self-sustaining fashion. However, if a short-circuit load condition exists, a current sensitive latch, to be described more fully below, prematurely terminates the starting cycle, thus preventing the inverter from resuming its normal sustained oscillations.

These and other objects and advantages of this invention will be more fully appreciated and understood from the following detailed description taken in conjuction with the accompanying drawings, of which:

FIG. 3 is a detailed schematic diagram of an inverter circuit in accordance with the present invention.

Figure 1:
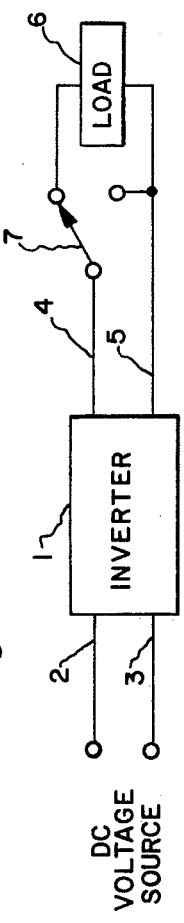
FIG. 1 is an electrical block diagram of an embodiment of the invention.

FIG. 1 illustrates an inverter 1 having input lines 2 and 3 connected to a dc voltage source for producing an ac electrical output on lines 4 and 5. The output of the inverter 1 is connected to a load 6 through a single pole, double throw switch 7. In general, the inverter 1 of FIG. 1 may be described as a self-sustaining oscillatory inverter including a current limiting characteristic wherein the output of the inverter is reduced to zero or substantially zero whenever an abnormally large overload current is attempted to be extracted therefrom. Inverters having this fall-back current limit characteristic are well known to those skilled in the art and are described, for example, in U.S. Pat. No. 3,781,638 and in commonly assigned copending application Ser. No. 516,773 filed Oct. 31, 1974.

In a preferred embodiment of our invention, normal inverter operation is at a relatively high frequency (e.g., 25 KHz) to minimize the necessary sizes of power circuit reactors, transformers, capacitors, etc. In a typical application, the inverter of FIG. 1 may be utilized as part of a line cord power supply where the dc voltage source across lines 2 and 3 is produced from a recitifier circuit connected to the usual 115 volt ac household power supply and where the ac load connected across lines 4 and 5 normally comprises another rectifier circuit for rectifying the relatively high frequency ac output of the inverter and producing a low voltage dc output for powering household appliances such as radios, phonograph machines, etc. Of course, the inverter circuit of FIG. 1 will also have other applications.

As illustrated, the preferred embodiment of FIG. 1 includes the switch 7 which connects the output lines 4 and 5 of the inverter to either the load 6 or to an electrical short circuit of the output lines of the inverter. In the embodiment illustrated, the switch 7 is preferably the on-off switch of the electrical appliance which load 6 represents. In this situation, when the appliance is turned on, the output of the inverter is connected to the load 6 for providing electrical power thereto. However, upon turning the appliance off, instead of open-circuiting the inverter as is the usual procedure, in accordance with our invention, the output of the inverter is electrically short circuited so that normal inverter operation is terminated and the power losses of the inverter are limited to those of the fall-back current characteristic as opposed to the open circuit no-load losses.

As pointed out above, under no-load conditions, the inverter continues to oscillate in a self-sustaining manner and incurs switching losses, transformer core losses, and if employed, rectifier losses. In many applications, where for example, the normal load requirement is 10 watts or less, the no-load losses are a substantial percentage of the full load losses. Hence, the normal procedure of open circuiting an inverter to remove power to a load unnecessarily wastes a substantial amount of energy. However, in accordance with our invention, the application of an electrical short circuit to the output terminals of an inverter quickly and efficiently stops inverter operation, i.e., stops inverter oscillation, and thereby eliminates switching losses, transformer core losses, and any losses normally encountered in subsequent rectifier stages, if any. By way of example, a typical inverter may exhibit a 10 percent power loss under no-load conditions, whereas when electrically short circuited, the power loss may be less than 1 percent. Accordingly, those skilled in the art can readily appreciate that a substantial reduction in no-load losses is achieved in accordance with our invention.

Still another advantage of our invention resides in the fact that by utilizing the short-circuit mode of operation to reduce the no-load losses, inverter operation is stopped without violating the integrity of the transformer isolation. This factor is critical in consumer applications, for example, where the danger of electrical shock to a consumer may prove to be fatal. Accordingly, our invention solves a particularly troublesome problem while substantially improving the no-load efficiency of operation of an inverter.

Figure 2:
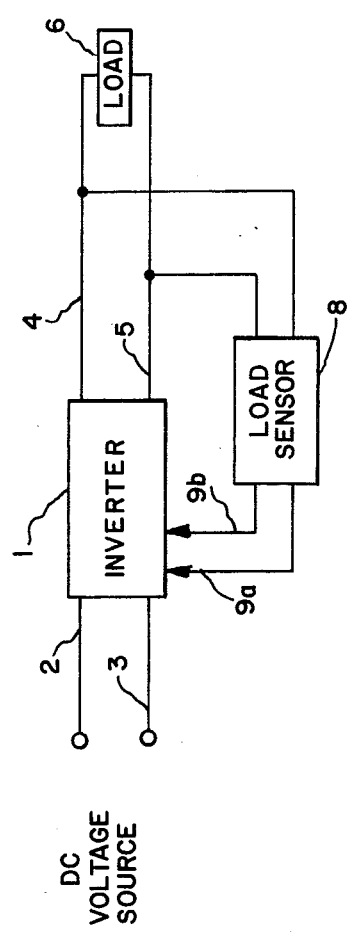
FIG. 2 is an electrical block diagram of an alternative embodiment of the invention utilizing a load-sensing element.

FIG. 2 illustrates yet another embodiment of our invention wherein the inverter 1 is electrically connected to a dc voltage source and a load in the manner described above with reference to FIG. 1. In this embodiment, however, the load 6 is directly connected to the output terminals 4 and 5 of the inverter 1 and load sensor 8 is connected to the output terminals 4 and 5. The function of the load sensor 8 is to sense a no-load condition at the output of the inverter 1 and provide an output signal on lines 9a and 9b to the inverter 1, which signal causes inverter operation to be quickly and efficiently shut down.

By way of example, the load sensor may monitor current flow into the load, voltage across the load, or power delivered to a load. Further, the load sensor may monitor a parameter which is proportional to one of the aforementioned load conditions and provide a signal to the inverter to achieve efficient and rapid shutdown of the inverter. Where the inverter, for example, is a pulse width modulated inverter, the load sensor could effectively reduce or otherwise control the pulse width of the inverter signals. Alternately, where the inverter is essentially a square wave inverter system, the load sensor could provide a suitable off signal thereto. Those skilled in the art can readily appreciate that various techniques may be employed for this purpose and the foregoing discussion provides a few examples illustrative of the application of the instant invention.

FIG. 3, by way of further illustration of the instant invention, depicts in electrical schematic diagram form, a specific inverter useful in the embodiments illustrated in FIGS. 1 and 2. More particularly, the inverter of FIG. 3 is a self-sustaining oscillatory inverter employing two transistors Q1 and Q2 for alternately switching the dc supply current through primary windings 20 and 22, respectively. The switching operation of transistors Q1 and Q2 is controlled by a tertiary winding W1 in conjunction with high efficiency switching control circuitry 24, from a thermal protection circuitry 26, and starting control circuitry 28. In general, the high efficiency switching control circuitry 24 is utilized to detect the inverter switching point to provide a low loss power transistor turn-off condition during switching transitions and to provide a low loss inverter operation during the period between turn-off of one power transistor and the turning on of the other. The thermal protection control circuitry 26 is utilized to initiate inverter shutdown under adverse thermal conditions. The starting control circuitry 28 provides inverter starting pulses at periodic intervals and helps maintain the inverter losses at a low level during excessive load conditions by maintaining the repetition rate of such starting pulses well below the normal switching repetition rate of the inverter circuitry.

As will be appreciated from the following detail description of the inverter of FIG. 3, resistor R15 and capacitor C1 have relatively large component values (to produce a high RC time constant and a consequent low repetition rate for the starting pulses) and resistor R3 has a relatively low component value (to minimize losses which substantially all of the primary current passes therethrough). For purposes of ease of description, the operation of the inverter of FIG. 3 will be described with the assumption that the entire circuitry is initially in its inactive state without the application of any power from the dc voltage source. Initially then, when the dc voltage source is applied to the circuit across lines 10 and 12, capacitor C1 will begin to charge through resistor R15, Q10, the base-emitter junction of Q9, and the base-emitter junction of the npn component of Q6.

The components Q6 and Q7 are current sensitive latch means which operate in a fashion similar to the traditional SCR circuitry, and in fact may be SCR's, if desired. Components Q6 and Q7 are illustrated as complementary types (e.g., pnp and npn) transistors which may conveniently be formed in a monolithic integrated circuit structure, together with the other cmponents of FIG. 3. Briefly stated, the Q6 component, for example, can be triggered either from a cathode gate 30 or from an anode gate 32 to its conductive state whereupon current will flow from an anode 34 to a cathode 36 provided that there is sufficient voltage drop thereacross to cause current to flow in an amount exceeding some predetermined threshold amount. So long as the current continues to flow from the anode to the cathode, the current sensitive latch Q6 will be latched in its conductive state. However, once the anode-cathode current of Q6 decreases below the predetermined threshold limit, the current latch will automatically reset itself to its nonconductive state until once again triggered in a subsequent operation.

The above-described charging circuit for capacitor C1 includes a negative feedback transistor Q10 whose function is to increase the charging time of C1 and thus further lower the repetition rate of the starting pulses produced by the starting circuitry 28.

The charging circuit for capacitor C1 as previously described also includes the base-emitter junction of the npn section of Q6. However, Q6 will not latch to its conductive state at this time since there is insufficient anode current at line 34, and correspondingly, insufficient cathode-anode voltage across Q6. Nevertheless, the npn section of Q6 does conduct whatever available current might be present at gate lead 32, thus effectively back-biasing the base of transistor Q3 to ensure that Q6 is "off" and effectively opening the emitter circuit of the power switching transistors Q1 and Q2 as may be seen from FIG. 3.

In this initial start-up stage of operation, if there is any base leakage current from power switching transistors Q1 and Q2, this leakage current would be quickly shunted to ground via diodes D5 or D6 and the current latch Q6, while this current latch is in its conductive state because of the charging of capacitor C1, even though this leakage current would still be insufficient to latch Q6 to its conductive state. Thus, in the absence of normal inverter operation, while capacitor C1 is charging, the provision of the current sensitive latch Q6 ensures a low power dissipation in the power switching transistors Q1 and Q2.

Since the charging current for capacitors C1 passes through the base-emitter junction of Q9, this transistor is turned "on," thus shunting any leakage current from the emitter-collector circuit of Q11 away from the base of Q8 thereby ensuring that Q8 is in its "off" state in the absence of normal inverter operation during the charging of capacitor C1.

This slow-charging process for capacitor C1 continues until the capacitor voltage reaches a predetermined value whereat a sufficient voltage is placed across Zener diodes D12 and D13 to cause these diodes to conduct. With the Zener diodes D12 and D13 now in their conductive state and current flow is through R15, R14, Zener diode D12, the emitter-base junction of Q11, the Zener diode D13, and the base emitter junction of the npn section of Q6. As this alternate current path appears, the base current to Q9 diminishes to turn Q9 to its "off" state. The resulting collector current from Q11 is then presented to the base of Q8 to turn this Q8 transistor "on." Once triggered in this manner, Q8 and Q11 are connected in a regenerative fashion to produce a very low voltage drop between the emitters thereof. As a consequence, the capacitor C1 is partially discharged through the anode gate (emitter-base junction of the pnp section) of Q7 and, in the process, provides sufficient current to trigger Q7 to its "on" or conductive state. The resulting current flow from the anode to cathode Q7 through resistors R15, R16, etc., is maintained by trigger input through R13 during normal inverter operation, thus inhibiting any further starting pulses.

There is sufficient energy remaining stored in capacitor C1 just after the triggering of Q7 to provide a starting pulse of current by the discharge thereof through Q7 and R16 into the node at the base of switching transistor Q1. This starting pulse provides initial base current to Q1, thus conditioning the base of Q1 for the eventual transition of this element to its "on" state. In addition, the starting pulse through Q7 and R16 provides a base current to transistor Q3 through resistor R1, diode D3, and resistor R5, and simultaneously through diode D5 and resistor R9, thus conditioning Q3 to its "on" state, thereby effectively connecting resistor R3 to the common emitter connection of switching transistor Q1 and Q2. In this manner, both the base and the emitter circuits of Q1 are conditioned to turn Q1 "on" and permit current to flow from the dc voltage source through line 10 to the center tap of the primary winding of T1, through primary winding 20, Q1, Q3, and R3 back to the return line 12 of the dc voltage source.

Finally, in addition, the starting pulse through resistor R16 provides power to the thermal protection circuit 26 through resistor R1 and diode D3 thus enabling the thermal protection circuit to begin operation in a manner more fully described in the above-referenced copending patent application.

As can now be appreciated, a current flow has been initiated in primary winding 20 comprising an inverter load current and transformer exciting current which also flows through Q1, Q3, and R3. As this current flow reaches a designed limit, the current flow increases sufficiently to develop a forward bias voltage across resistor R3 to the Q4 base-emitter junction so as to partially turn transistor Q4 "on." When this partial turn-on occurs, a portion of the Q3 base current is shunted through the collector-emitter circuit of Q4. This significant reduction in base current to Q3 significantly raises the collector impedance of Q3, thus permitting the emitter potential of Q1 to rise. Concurrently, a portion of the Q1 base current is also shunted to circuit ground via diode D5, the emitter-base junction of the pnp section of Q6 and Q4. However, the current flow through the anode gate 32 of Q6 is not sufficient to trigger Q6 to its conductive state at this time due to a strong reverse bias still being applied to the Q6 cathode gate 30 by the discharge current from C1 flowing through diode D10 and the cathode gate of Q6. Accordingly, the peak collector current of Q1 is thus regulated during the inverter start-up phase while capacitor C1 is still discharging.

As this initial start-up cycle of the inverter continues, the current flowing in the primary and secondary windings of transformer T1 increases as does the current flowing in the low voltage tertiary winding W1. As should be apparent from the dot convention shown in FIG. 1, the current flowing during this initial start-up cycle of inverter operation in primary winding 20 is in a direction so as to cause current to be induced in the tertiary winding W1 flowing from right to left as shown in FIG. 3. Accordingly, as the start-up cycle continues, the base current of transistor Q1 is provided from the left end of tertiary winding W1 through resistor R1. In addition, this current from tertiary winding W1 is available through diode D3 to power the switching control circuitry 24 and thermal protection circuitry 26. The return current path to the opposite end of winding W1 is from circuit ground through diode D2 as shown in FIG. 3. Thus, this current flow also provides a form of reverse bias to the Q2 base-emitter junction ensuring that this device remains in its "off" state. On the other hand, if the load impedance connected to the output windings of transformer T1 is abnormally low, insufficient current will be delivered by tertiary winding W1 to maintain circuit operation after the discharge of capacitor C1. Under this normal condition, the inverter will automatically shut down near the end of the C1 discharge cycle thus initiating a new starting cycle as just described at a subsequent time interval.

Assuming that normal conditions prevail, a successful starting cycle will continue such that the current flowing through winding 20, Q1, Q3, and R3 increases until the magnetic circuit of transformer T1 begins to saturate. The onset of magnetic saturation causes an increased rate of voltage rise across R3 which acts to completely forward bias the base-emitter junction of Q4 and turn this device to its "on" state. With Q4 "on," the base current of Q3 is effectively shunted away therefrom thus turning Q3 "off." In addition, the anode trigger lead 32 of Q6 is effectively shorted to ground thus causing sufficient gate current flow so as to trigger Q6 to its conductive state. This triggering of Q6 is now permitted since the discharge of capacitor C1 will have been completed earlier in this initial start-up cycle such that the Q6 cathode gate 30 no longer has a strong reverse bias applied thereto. Accordingly, with Q6 triggered to its conductive state, the base of Q1 is effectively shunted to ground through diode D5 and Q6. As should now also be apparent, the emitter voltage of Q1 is synchronously allowed to rise because of the substantially simultaneously turning "off" of Q3 by the same action which triggers Q6 to its conductive state. Whenever the trigger point is reached, the base of Q1 is shunted to ground and simultaneously, the emitter voltage of Q1 is permitted to rise, thus rapidly transitioning Q1 from its "on" state to its "off" state. As should now be appreciated, the current-sensitive latch means Q6 rapidly withdraws all the stored charge from Q1 thus facilitating and promoting the rapid cut-off of Q1 in a most efficient manner. Q6 will remain latched to its conductive state so long as there is sufficient current flowing therethrough to maintain it in this state. However, once the stored charge has been withdrawn from the base of Q1 (including the stored charge still flowing therethrough through winding W1) falls below the minimum threshold level, Q6 will automatically reset itself to its nonconductive state thereby preparing the controlled circuit for a subsequent cycle of operation.

At this point, energy will be stored in transformer T1. As the electromagnetic components of T1 try to adjust to this change in electrical conditions caused by the turning off of Q1, the Q1 collector voltage will increase while the Q2 collector voltage decreases. As time continues to progress, the Q2 collector voltage may actually fall below circuit ground thus forcing Q2 to momentarily operate in an inverted mode with base current provided by a diode D8. This inverted mode of operation effectively clamps the voltage across the transformer windings thus preventing large Q1 collector voltage overshoots.

Subsequently, upon reversal of the voltage in windings 20 and 22, a voltage is induced in the tertiary winding W1 which will supply the base current to Q2 via R2 and to the control circuit and thermal protection circuits via diode D4. The return current path to the opposite end of tertiary winding W1 is from circuit ground via diode D1. As before, the voltage drop across diode D1 provides a reverse bias for the base junction of Q1 ensuring that Q1 now remains in its "off" while Q2 is "on." This second cycle of inverter operation will continue until the transformer magnetic circuit again begins to saturate. As before, the onset of saturation results in increased current through resistor R3 and, accordingly, an increased voltage thereacross which completely forward biases transistor Q4 to its "on" state. The triggering of Q4 to the fully "on" state, as before, results in turning Q3 "off" and in triggering Q6 to its latched "on" or conductive state determinate the second cycle of operation. The third and succeeding cycles of operation alternating between the conduction of switching transistors Q1 and Q2 follows as previously described in a cyclic fashion. The base current for inverted mode operation of Q1 is provided by diode D7 in a manner directly analogous to that already described with respect to diode D8 and the inverted mode of operation for switching transistor Q2.

As should now be appreciated, anytime the combined load and transformer exciting current passing through resistor R3 reaches the Q4 trip level, the inverter cycle then in progress is terminated. Consequently, if a low impedance or short-circuit load is applied to the output of the inverter, as for example in the manner described above with reference to FIGS. 1 or 2, the inverter operation then in progress is prematurely terminated. Under these conditions, there will be insufficient stored energy in the transformer T1 to maintain inverter operation. Accordingly, under such abnormally low output impedance conditions, the power stages of the inverter are automatically shut down thus protecting the transformer, switching transistors, and other circuit devices from overload conditions. Of course, after such a shut down is experienced, the starting circuit 28 will begin to produce periodic starting pulses (at a much lower rate than the normal switching frequency of the inverter). However, so long as the abnormally low output impedance condition persists, the starting pulses will not be successful in restarting the inverter operation for the reasons discussed above.

Since the thermal protection circuit 26 forms no part of the instant invention, it is believed sufficient to only briefly describe the operation thereof. For more complete description of the operation of the thermal protection circuit 26, reference may be made to the aforementioned copending patent application. Briefly, however, the voltage appearing at the output of the thermal protection circuit 26 across lines 38 and 40 is inversely related to the temperature of the protected circuitry. Thus, as the temperature increases, the voltage at the emitter of Q16 drops. Over-temperature control is provided when the base-emitter potential of Q5 drops to the point where Q5 collector current ceases. When Q5 is thus turned off, the supply current normally flowing through R7 and Q5 is transferred to the Q6 cathode gate 30 via resistor R8. Thus, Q6 is triggered to its conductive state whenever Q5 is turned off by a detected excessive temperature and causing the entire inverter to shut down in exactly the same manner as when Q6 is triggered to its conductive state by the operation of Q4. The trip point temperature can be varied by altering the resistor R4, R6 voltage divider ratio as should be apparent to those skilled in the art.

In summary, we have described an effective method and apparatus for reducing the no-load losses of an inverter without violating the integrity of the transformer isolation. In further accord with our invention, an inverter is described in which a starting circuit, in the absence of normal operation, periodically generates a starting pulse which conditions the active element switches and the electrical control elements to initiate a current flow in the primary winding of the transformer. If normal load conditions prevail, this action initiates a first cycle of inverter operation and the inverter will begin to oscillate in a self-sustaining fashion. However, if a short-circuit load condition exists, a current-sensitive latch prematurely terminates the starting cycle, thus preventing the inverter from resuming its normal sustained oscillations while requiring only that power necessary to periodically generate a starting pulse for the inverter. Hence, where a normal load is not applied to the inverter and the output thereof is short circuited, the inverter losses are substantially reduced.

Although only a few specific exemplary embodiments of this invention have been described in detail, those in the art will appreciate that many modifications and variations may be made without materially departing from the novel and improved aspects of the invention. Accordingly, all such variations and modifications are intended to be included within the scope of this invention as defined by the appended claims.

What is claimed is:

1. A method of reducing the no-load power losses of an inverter system including an inverter having a fallback current limit during electrical short circuit conditions which is characterized by lower power losses than open circuit losses, said method comprising:
  removing the load from the output terminals of said inverter; and
  applying an electrical short circuit to said output terminals to terminate normal inverter operation.

2. The method of claim 1 further comprising:
  periodically generating a starting signal for said inverter, said starting signal occurring at a rate substantially less than the normal repetition rate of said inverter and effective to start said inverter in the absence of an electrical short circuit.

3. The method of claim 1 wherein the step of applying an electrical short circuit occurs substantially simultaneously with the removal of said load.

4. An electrical inverter system comprising:
  an inverter including input and output means, said input means adapted to be connected to a source of power and said output means including a pair of output terminals; and
  electrical switching means connected to at least one of said output terminals and connectable in one switch position to a load and in another switch position to said other output terminal, the connection to said other output terminal causing an electrical short-circuit of the output terminals of said inverter and terminating normal inverter operation.

5. The electrical inverter system of claim 4 wherein said inverter includes starting means, which in the absence of a short circuit at the output terminals of said inverter periodically generates a starting signal for said inverter.

6. The electrical inverter system of claim 4 wherein said inverter further comprises:
  a transformer having magnetically coupled primary and secondary windings;
  a pair of switching devices operatively connected to said primary winding for alternate switching of electrical current in said primary winding; and
  starting control circuitry operatively connected to said inverter for providing in the absence of normal inverter operation, starting pulses at periodic intervals substantially below the normal switching repetition rate of said inverter.

7. The electrical inverter system of claim 6 wherein said starting control circuitry includes a resistor and a capacitor for establishing the repetition rate of said starting pulses.

8. The electrical inverter system of claim 4 wherein said load comprises an electrical appliance.

9. The electrical inverter system of claim 8 wherein said electrical switching means comprises a single pole double-throw switch.

10. The electrical inverter system of claim 8 wherein said electrical appliance includes said electrical switching means as an on-off switch.

* * * * *